United States Patent [19]

Ek

[11] Patent Number: 4,842,879

[45] Date of Patent: Jun. 27, 1989

[54] APPARATUS AND PROCESS FOR ROLLING A SHEET OF PASTRY MATERIAL

[75] Inventor: Kurt L. Ek, Vaesteraes, Sweden

[73] Assignee: Nestec S.A., Vevey, Switzerland

[21] Appl. No.: 132,791

[22] Filed: Dec. 14, 1987

[30] Foreign Application Priority Data

Dec. 23, 1986 [EP] European Pat. Off. ......... 86117993.5

[51] Int. Cl.$^4$ .......................... A21C 15/02; A23P 1/00
[52] U.S. Cl. .................................. 426/297; 99/450.6; 99/450.7; 425/373; 426/497; 426/501
[58] Field of Search ............... 426/297, 497, 499, 501, 426/502; 99/450.6, 450.7; 425/363, 373

[56] References Cited

U.S. PATENT DOCUMENTS

| | | | |
|---|---|---|---|
| 2,888,888 | 6/1959 | Jorgenson et al. | 426/297 |
| 3,037,467 | 6/1962 | Rustad | 425/373 |
| 3,172,372 | 3/1965 | Packman | 426/297 |
| 3,225,710 | 12/1965 | Schafer | 426/297 |

FOREIGN PATENT DOCUMENTS 2272611 12/1975 France.

Primary Examiner—George Yeung
Attorney, Agent, or Firm—Vogt & O'Donnell

[57] ABSTRACT

An apparatus and process are provided for rolling a sheet of baked pastry material for forming a layered roll of the pastry material which may include layers of filling material in between the rolled layers of the pastry material. A sheet of pastry material is advanced on an upper surface of a conveyor belt and is contacted by a roller which has a longitudinal axis diagonal to the direction of travel of the belt and which has a diameter which diminishes from its upstream end to its downstream end with respect to the direction of travel of the belt. The rolled material is discharged from the conveyor at the narrower downstream end of the roller and then may be cut into discrete rolled pieces.

11 Claims, 1 Drawing Sheet

APPARATUS AND PROCESS FOR ROLLING A SHEET OF PASTRY MATERIAL

BACKGROUND OF THE INVENTION

The present invention relates to a process and machine for making large pastas in the form of swiss rolls.

Equipment is described in FR-A-2272611 for making filled products in the form of rolled up ribbons, for example, filled crepes prepared from a strip of baked pastry. Such equipment comprises a conveyor belt, a cutter and a roller by means of which a strip of baked pastry, while being transported on the conveyor belt, is first cut into ribbons which, after having been dosed with filling material, are rolled up on themselves by contacting the roller, positioned transversely above and whose longitudinal axis is parallel to the flat surface of the conveyor belt, which roller rotates on its longitudinal axis in a direction opposite to the movement of the conveyor belt and transmits a rotatory movement to the ribbons of cooked pastry which causes them to roll upon themselves. The axis of the roller may be positioned diagonally in relation to the conveyor belt. However, this equipment is used for making rolled products of narrow width, whereas our object is to make rolled pastas with a large width which are to be cut later. The normal thickness of pastry material for crepes is about 2 mm, whereas we want to use a pasta thickness of about 0.9 to 1.7 mm thickness. The method of the French patent would involve difficulties in picking up such a thin sheet without tearing and without leakage of the filling. The pasta would also have an irregular, unattractive shape.

We have found, surprisingly, that if the roller is positioned at an angle across the width of the conveyor belt and if its upstream end is wider than its downstream end, these problems can be overcome.

SUMMARY OF THE INVENTION

The present invention provides a machine for making large pastas in the form of swiss rolls which comprises a conveyor belt for transporting a thin sheet of baked pastry material above which is positioned a roller extending diagonally across the width of the belt characterised in that the diameter of the roller diminishes from its upstream end to its downstream end.

The present invention also provides a process for making large pastas in the form of swiss rolls which comprises advancing a sheet of baked pastry material on a conveyor belt and contacting its leading edge with the surface of a roller extending diagonally across the width of the belt and rotating on its longitudinal axis in a direction whereby the adjacent faces of the roller and belt travel in substantially opposite directions so that a rotatory movement is transmitted to the sheet of pastry material which causes it to roll upon itself characterised in that the diameter of the roller diminishes from its upstream end to its downstream end.

DESCRIPTION OF THE PREFERRED EMBODIMENTS

In accordance with the present invention, the conveyor belt is conveniently substantially horizontal and the roller is positioned just above the belt preferably so that its lower surface is from 0.5 to 7.5 and preferably from 1.5 to 5.0 mm above the upper surface of the conveyor belt. The roller is adapted to rotate on its longitudinal axis in a direction so that the adjacent faces of the roller and belt travel in substantially opposite directions.

The diameter of the horizontal roller conveniently diminishes regularly and gradually from the upstream end to the downstream end. For example, the diameter at the upstream end may be from 60 to 100 mm, preferably from 70 to 90 mm while at the downstream end the diameter may be from 30 to 70 mm and preferably from 40 to 60 mm.

The horizontal roller preferably extends at an angle of from 30° to 60° and preferably from 40° to 50° to the direction movement of the conveyor belt. The average diameter of the roller may conveniently be larger when this angle is greater.

The speed of rotation of the roller may be variable, for instance, from 25 to 150% and preferably from 50 to 100 revolutions per minute.

Means may also be provided for supplying a filling material onto the upper surface of the thin sheet of pastry material on the conveyor belt before rolling. Such means may be conventional, e.g., a hopper at the lower end of which is an axle equipped with pins revolving at high speed.

Cutting means may also be provided to cut the rolled pastry material into pastas of suitable size.

The thin sheet of baked pastry material may be prepared, for instance, by the liquid-pasta process.

The amount of filling material used may vary according to requirements but in the preparation of the swiss roll pastas according to the present invention a layer of filling material applied onto the upper surface of the pastry material has a thickness conveniently from about 4 to 10 mm and preferably from 5 to 8 mm. Examples of filling materials include vegetables, such as carrots, beans or spinach, meat, meat sauce, cheese or stew, or mixtures of such materials as desired. Relatively dry filling materials are advantageous.

The thin strip of pastry material on the conveyor belt is conveniently from 1 to 1.6 mm, preferably from 1.1 to 1.5 mm and especially from 1.2 to 1.4 mm thickness.

After being rolled, the pastry material may be cut into pastas of suitable size and then, if desired, deep-frozen.

The pastas produced by the process of this invention are firm, have an attractive appearance and there is no leakage of the filling material.

The present invention will now be further described by way of example with reference to the following drawings.

DETAILED DESCRIPTION OF THE DRAWINGS

Figure 1:
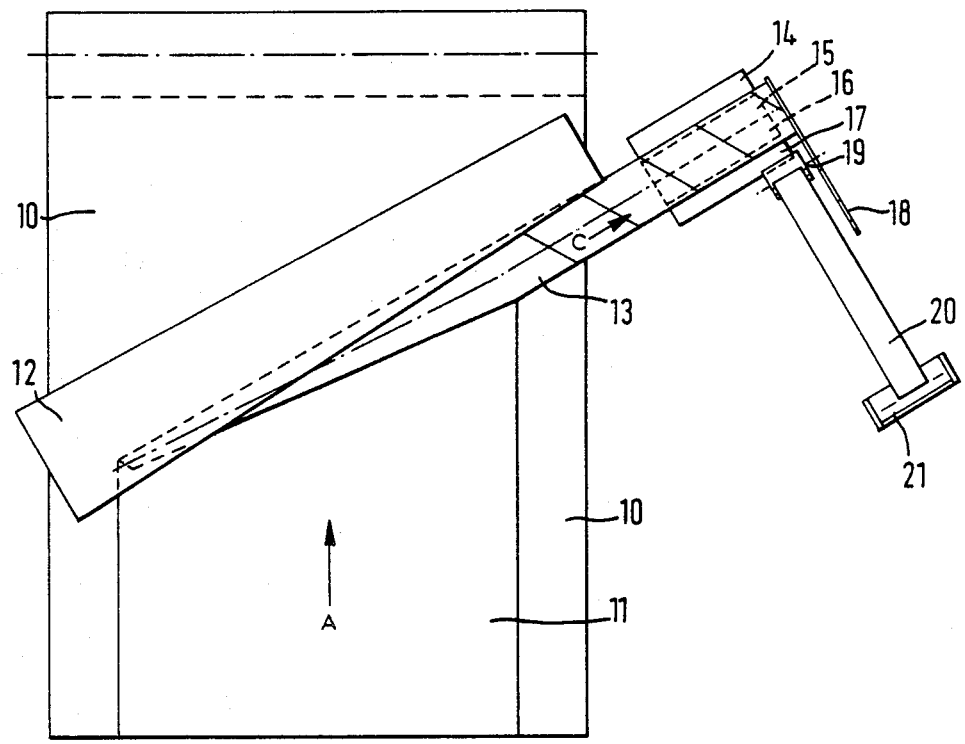
FIG. 1 is a diagrammatic top plan view of the machine.
Figure 2:
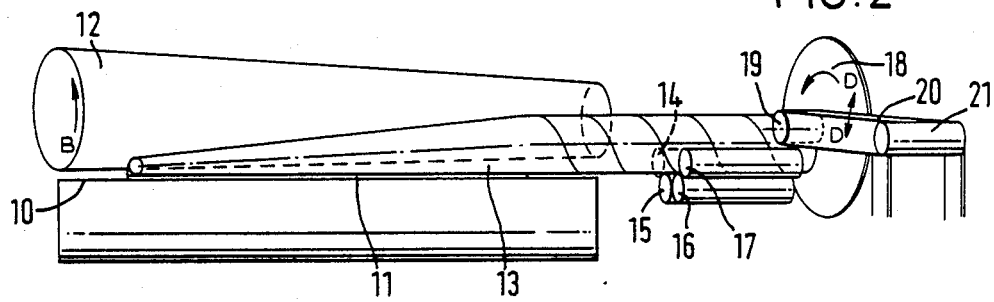
FIG. 2 is a perspective view looking in the direction of the arrow A.

Referring to the drawings, the machine comprises a conveyor belt 10 adapted to travel in the direction of the arrow A for transporting a sheet of baked pastry 11 towards a roller 12 driven by a compressed air motor (not shown) positioned at an angle of 45° to the direction of travel, having a diameter of 80 mm at the upstream end and a diameter of 50 mm at the downstream end, the lower surface of the roller being 0.2 mm above the upper surface of the conveyor belt. As can be seen from the direction of the arrows A of FIG. 1 and B of FIG. 2, the roller 12 is adapted to rotate on its longitudinal axis so that the adjacent faces of the roller and belt travel in substantially opposite directions. Guide rollers 14,15,16 and 17 are provided for supporting the rolled pastry 13 as it flows in the direction of the arrow C towards a vertically reciprocating rotating circular cutting knife 18, provided with an axle 19 attached to arm 20 adapted to reciprocate as indicated by the arrow D-D, by means of a cylindrical pivot 21.

In operation, the conveyor belt 10, travelling in the direction of the arrow A, carries a sheet baked pastry 11 having a thickness of 1.3 mm beneath the filler (not shown) and towards the roller 12 revolving at 75 revolutions per minute in the direction of the arrow B. The filler deposits on the pastry a 6 mm layer of filling material comprising a mixture of spinach, ham and ricotta cheese. When the leading edge of the pastry contacts the roller, it begins to fold and roll over itself until it forms a rolled pastry 13 which flows in the direction of the arrow C off the edge of the conveyor belt over the guide rollers 14,15,16,17 towards the circular cutting knife 18, the axle of which 19 is attached to the arm 20 which reciprocates about the pivot 21. The reciprocating movement is synchronised by conventional means (not shown) so that the circular knife descends to cut the rolled pastry into individual pastas of the appropriate size, then ascends to allow a suitable length of rolled pastry material to pass beneath it and then descends to cut the rolled pastry into another pasta of suitable size. The rolled pastas are then transported away on another belt (not shown) and finally deep-frozen.

Other suitable filling materials include meat sauce, a vegetable/meat mixture and a mixture of carrots and beans mixed with stew.

I claim:

1. An apparatus for rolling a sheet of pastry material comprising:
    a conveyor belt for transporting a sheet of baked pastry material on an upper surface of the belt; and
    a roller positioned above the upper surface of the belt having its longitudinal axis extending diagonally across the width of the belt and having a diameter which diminishes from its upstream end to its downstream end with respect to the direction of travel of the belt for contacting and transmitting rotatory movement to the sheet of pastry material for rolling the sheet over onto itself for forming a layered roll of the pastry material.

2. An apparatus according to claim 1 wherein the roller is adapted to rotate about its longitudinal axis in a direction so that adjacent faces of the roller and upper surface of the belt travel in substantially opposite directions.

3. An apparatus according to claim 1 wherein the roller is positioned above the upper surface of the belt so that its surface adjacent the upper surface of the belt is from 0.5 mm to 7.5 mm above the upper surface of the belt.

4. An apparatus according to claim 1 wherein the diameter of the roller diminishes regularly and gradually from the upstream end to the downstream end of the roller.

5. An apparatus according to claim 4 wherein the diameter of the roller is from 60 mm to 100 mm at the upstream end and from 30 mm to 70 mm at the downstream end.

6. An apparatus according to claim 1 wherein the longitudinal axis of the roller extends across the belt at an angle of from 30° to 60° with respect to the direction of movement of the belt.

7. An apparatus according to claim 1 further comprising means for supplying filling material onto an upper surface of the pastry material on the belt upstream from the roller.

8. An apparatus according to claim 1 further comprising means adjacent the conveyor belt and adjacent the downstream end of the roller for accepting the rolled pastry and cutting it into discrete pieces.

9. A process for rolling pastry material comprising advancing a sheet of baked pastry material on a conveyor belt and contacting the advancing sheet of pastry material with a roller having its longitudinal axis extending diagonally across the width of the belt and having a diameter which diminishes, with respect to the direction of travel of the belt, from its upstream end to its downstream end and having its surface rotating in a direction substantially opposite that of the travel of the belt for transmitting rotatory movement to the sheet of pastry material for rolling the pastry material over onto itself for forming a layered roll of the pastry material and for discharging the rolled pastry material from the belt at the downstream end of the roller.

10. A process according to claim 9 further comprising depositing filling material on the sheet of pastry material on the belt upstream from the roller for forming a rolled layered pastry material layered with the filling material.

11. A process according to claim 9 further comprising cutting the discharged rolled pastry material into discrete portions.

* * * * *